United States Patent [19]

Fearnside et al.

[11] 4,278,995
[45] Jul. 14, 1981

[54] COLOR LINE SENSOR FOR USE IN FILM SCANNING APPARATUS

[75] Inventors: William T. Fearnside, Fishers; Teh-Hsuang Lee, Webster, both of N.Y.

[73] Assignee: Eastman Kodak Company, Rochester, N.Y.

[21] Appl. No.: 68,030

[22] Filed: Aug. 20, 1979

[51] Int. Cl.³ .............................................. H04N 9/11
[52] U.S. Cl. ..................................................... 358/54
[58] Field of Search .................. 358/54, 48, 44, 6, 75, 358/78, 212, 213

[56] References Cited

U.S. PATENT DOCUMENTS

| 3,720,782 | 3/1973 | Kaminski et al. | 358/41 |
| 3,803,353 | 4/1974 | Sanderson et al. | 358/54 |
| 3,971,065 | 6/1976 | Bayer | 358/41 |

OTHER PUBLICATIONS

Wright, "Solid-State Sensors: The Use of a Single Dimension 512-Element Array for Film Scanning", BBC Research Report No. 1973/32.
Childs et al., "An Experimental Telecine Using a Line-Array CCD Sensor", SMPTE Journal, vol. 87, No. 4, Apr. 1978, pp. 209-213.

Primary Examiner—John C. Martin
Attorney, Agent, or Firm—Thomas H. Close

[57] ABSTRACT

A color line sensor for use in color film scanning apparatus is disclosed. The scanning apparatus is of the type employing a line sensor for scanning an image of the film in one direction and having means for continuously displacing the image relative to the sensor, in a direction generally perpendicular to the line scan direction, to effect a raster scan composed of a number of equally spaced lines. The color line sensor includes a plurality of line sensing arrays, spaced apart from each other by a distance corresponding to the spacing between scan lines in the raster. Each line sensing array is sensitized to a particular color of light so that a plurality of color signals are produced by the sensor. Respective color signals from the line sensing arrays are delayed by an amount sufficient to cause all the color signals emerging from the color line sensor at any given instant to represent the same point in the image.

5 Claims, 2 Drawing Figures

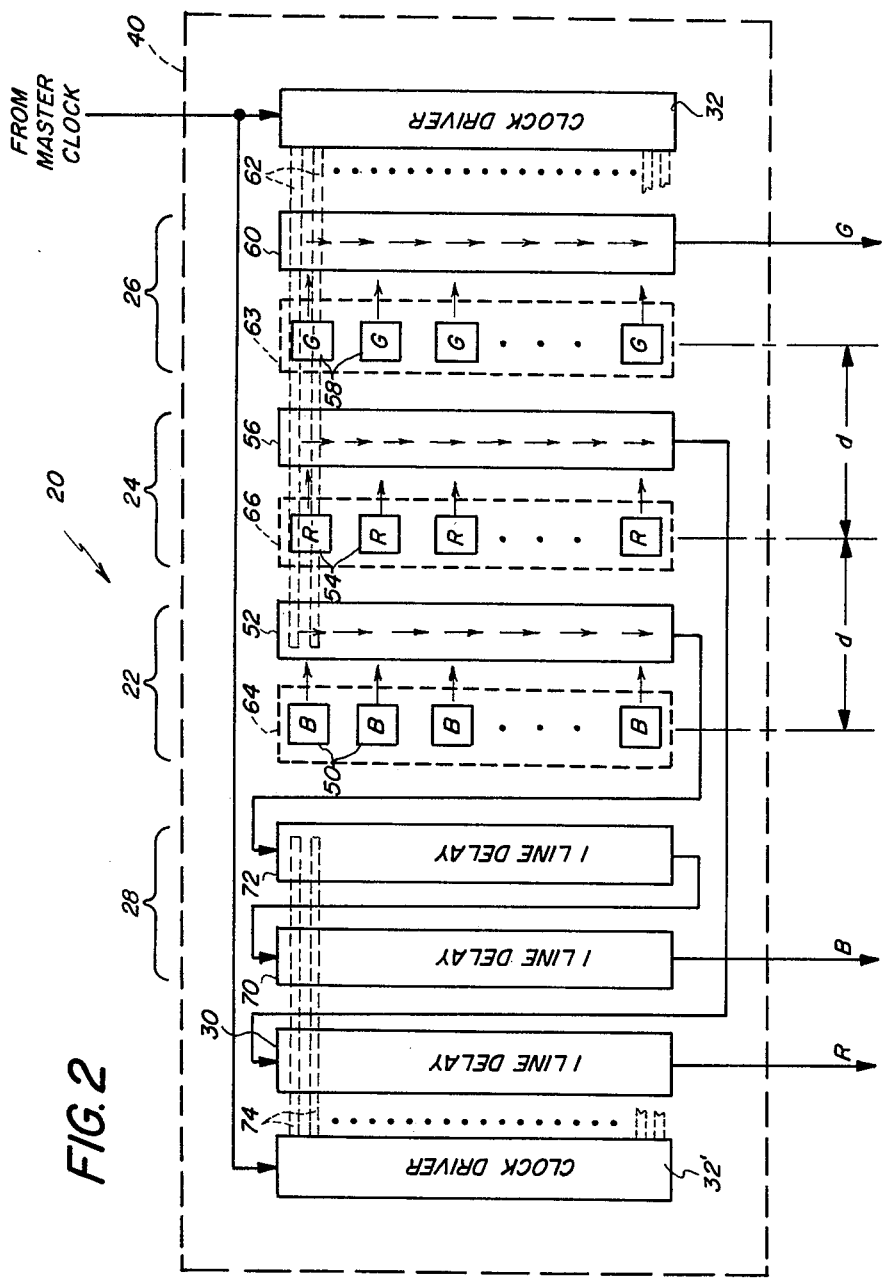

COLOR LINE SENSOR FOR USE IN FILM SCANNING APPARATUS

BACKGROUND OF THE INVENTION

1. Field of the Invention

This invention relates to line sensors employed in apparatus of the type having a line sensor for scanning an image in one direction and means for displacing the image relative to the sensor in a direction perpendicular to the line scan to effect a raster scan of the image, and more particularly to a color sensitive line sensor for use in such scanning apparatus.

2. Discussion Related to the Problem

Apparatus for scanning motion picture film to produce a television signal is well known. Usually, in such film scanning apparatus, a film frame is scanned in a direction generally perpendicular to the length of the film at a standard television field rate. In the past, the line scan has been accomplished by flying spot scanners employing Nipkow discs, movable reflecting elements or cathode ray tubes. The use of a solid-state line sensing array as an alternative to a flying spot scanner to provide the line scanning function in a film scanner has been proposed, See. D. T. Wright, "Solid-State Sensors; The Use of a Single Dimension 512-Element Array for Film Scanning", BBC Research Department Report No. 1973/32. The potential advantages of a line sensing array over a flying spot scanner are numerous, including: reduced size, weight, maintenance and cost. These advantages make the solid-state line sensing array particularly attractive for use in a film scanner for displaying amateur movie film on a home television set. The ability to scan color film to produce a color television signal would be a very desirable feature in such a film scanner.

It has been suggested (see I. Childs and J. R. Sanders, "An Experimental Telecine Using a Line-Array CCD Sensor", SMPTE Journal, Vol. 87, No. 4, April 1978), that color operation could be achieved by employing a conventional prism block beam splitter, of the type used in color TV cameras, in combination with three line sensing arrays to provide the three color separation signals. The advantages of this approach are the rather complex optical system required to split the beams and the precision mechanical adjustment required to register the separate sensors.

An alternative approach, based on analogy with prior art solid-state image sensing arrays, would be to mask individual photosites along a single line sensor with a pattern of color filters such as R, G, B, R, G . . . . The output video signal would then be demultiplexed into three channels, each channel having samples of only one color. The signal samples in the channels could then be interpolated to supply continuous R, G and B color separation signals. This technique would obviate the need for beam splitters and precision mechanical registration but would suffer from reduced resolution. In addition, the process of filter fabrication for individual photosensing sites is difficult, and the light absorbed by a filter over one color photosite is unavailable to another photosite of the same picture element group, thereby reducing the light gathering efficiency of the sensor.

The problem therefore is to provide a color image sensor configuration that does not require the precision mechanical alignment and complex optical beam splitting arrangement of the three sensor configuration, yet is free from the precision filter manufacturing requirements and limited resolution of the color filter array sensor configuration.

SOLUTION—SUMMARY OF THE INVENTION

The present invention solves the above-noted problems by providing a color line sensor which includes a plurality of line sensing arrays. The arrays are spaced apart from each other by a distance corresponding to a whole multiple of the spacing between scan lines of the raster scan effected by the scanner. Each line sensing array is sensitized to a particular wavelength range of light so that a plurality of color signals are produced by the sensor. The color signals from selected line sensing arrays are delayed by an amount sufficient to cause all the signals emerging from the color line sensor at any instant to represent the same location in the image.

In a preferred three color embodiment of the color line sensor, three line sensing arrays are formed on a common substrate, thereby taking advantage of integrated circuit manufacturing techniques to achieve highly accurate spacing between the arrays. The arrays are spaced apart from each other by a distance corresponding to the distance between scan lines in the raster produced by the scanner. The three arrays are sensitized to blue, green and red wavelengths of light, respectively, by covering each array with a filter strip, thereby obviating the need to define a separate filter over each element of each array. The sensor is designed to be used so that the images being scanned move across the sensor in the direction from the blue sensing array to the green sensing array. The signal from the blue sensing array is delayed by two line scan times and the signal from the red sensing array is delayed by one line scan time. In this way, all the signals emerging from the scanner at any given time represent the same location within the image. Human visual response to fine detail is most sensitive in the green region of the spectrum and least sensitive in the blue region of the spectrum. Since the delay elements introduce some reduction in signal-to-noise ratio, the colors are arranged from blue to red then to green so that the signal from the green sensitive sensing array, which contains the most useable detail information, will not be delayed and will therefore have the least noise. For a similar reason, the signal from the blue sensitive sensing array, which has the least useable detail information, is selected to receive the two line delay.

DESCRIPTION OF THE DRAWINGS

The invention will be described with reference to the drawings, wherein:

FIG. 2 is a schematic diagram showing the layout of a preferred embodiment of a color line sensor according to the present invention.

DESCRIPTION OF THE PREFERRED EMBODIMENT

Figure 1:
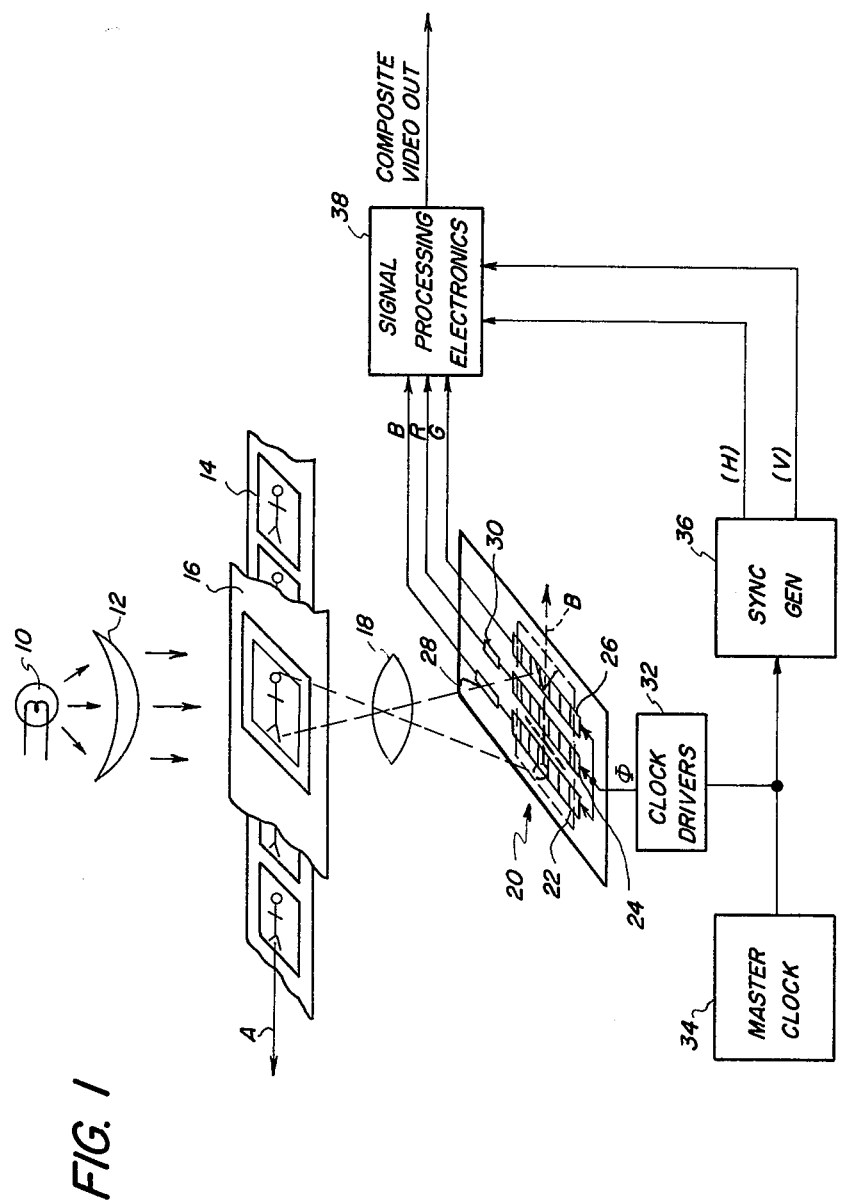
FIG. 1 is a schematic diagram of a film scanning apparatus including a color line sensor according to the present invention.

For purposes of illustration, simplified film scanning apparatus employing a color line sensor according to the present invention is shown schematically in FIG. 1. It is to be understood that scanning apparatus employed with the present invention may include means for converting the motion picture frame rate to a standard television field rate such as the frame store device as disclosed by Childs and Sanders (supra), or a rotating polygon frame-rate converting scanner of the type disclosed in copending U.S. patent application Ser. No. 068,032 entitled FILM SCANNING METHOD AND APPARATUS EMPLOYING OPTICAL SPLICE TECHNIQUE FOR FRAME-RATE CONVERSION by D. G. Howe.

The scanning apparatus as shown in FIG. 1 includes a light source 10 and condensing lens 12 for illuminating a portion of motion picture film 14 in a film gate 16. Light passing through the film 14 is imaged by scan lens 18 onto a line sensor 20.

As the film 14 is moved in the direction of arrow A, the projected image of the film moves in the direction of arrow B relative to line sensor 20. The line sensor scans the image of the film line by line in a direction generally perpendicular to the length of the film and the motion of the film displaces the successive scan lines in a direction parallel with the length of the film, to scan the image of a film frame in a raster pattern. Sensor 20 is operated at a line rate sufficient to scan an image of a film frame with a number of lines equal to the number of lines in a standard television field, e.g. 262.5 lines.

Color line sensor 20 includes three line sensing arrays 22, 24 and 26 such as charge coupled device (CCD) line sensors. The line sensing arrays are spaced apart by a distance d corresponding to the normal vertical spacing between the scan lines in the field scan raster. Since there are 262.5 scan lines per standard television field, the spacing d between the line sensing arrays is 1/262.5 of the height of the projected frame image.

Each line sensing array is covered with a filter strip to tailor the spectral response of the array to a particular color. Array 22 is covered with a blue filter strip; array 24 with a red filter strip; and array 26 with a green filter strip. Thus, array 22 produces a signal representing the blue component of the scanned image, array 24 produces a signal representing the red component of the scanned image, and array 26 produces a signal representing the green component of the scanned image. So that the red, green and blue signals emerging from line sensor 20 at any given time represent the same point in the scanned image, the blue signal is delayed by an amount equal to the time required to scan two lines and the red signal is delayed by an amount required to scan one line. Delay circuit 28 provides the two line delay and delay circuit 30 provides the one line delay. The scanning actions of the line sensing arrays are controlled by multiphase clock signals Φ supplied by clock drivers 32. The clock drivers are in turn driven by a master clock 34 which also drives a television synchronization signal generating circuit 36. The synchronization signal generating circuit 36 generates standard horizontal (H) and vertical (V) synchronization signals which are supplied to signal processing electronics 38. The signal processing electronics also receives the blue, red and green color separation signals from line sensor 20 and generates a composite color video signal in a known manner.

FIG. 2 shows a preferred arrangement for the color line sensor 20. The line sensing arrays 22, 24 and 26 and the delay circuits 28 and 30 are manufactured on a common substrate, such as a silicon chip 40, employing well-known integrated circuit fabrication techniques. By manufacturing the line sensing arrays on a common substrate, the required spacing between the arrays may be achieved to a very high degree of accuracy.

Line sensing array 22 is comprised of a row of photosites 50 adjacent a charge coupled device (CCD) shift register 52. As is well known, in such a line sensing array, photocharges accumulated in the photosensing sites may be transferred in parallel to the shift register, then serially shifted out of the register to produce a signal representing one line of video information. Similarly, line sensing array 24 is composed of photosites 54 and a CCD shift register 56; and line sensing array 26 is composed of a row of photosites 58 and a CCD shift register 60.

Each CCD shift register includes a plurality of transfer electrodes to which are applied the multiphase clock signals to control the serial shifting of photocharges from the registers. For a more complete description of the operation of a line sensing array employing a CCD shift register, see "Charge Transfer Devices", by C. H. Sequin and M. F. Thompsett, Academic Press, 1975. The transfer electrodes 62, of which only two are shown for purposes of illustration, are common to the shift registers for arrays 22, 24 and 26 to thereby synchronize their operation. The multiphase clock signals applied to the electrodes are generated by a clock driver circuit 32 which may also be manufactured "on board" the chip.

Each row of photosites is covered by a color filter to tailor the spectral response of the line sensing array to a particular color. A blue filter 64 is disposed over the row of photosites 50; a red filter 66 over photosites 54 and a green filter 68 over photosites 58.

Delay circuits 28 and 30 are also comprised of CCD shift registers equal in length to the shift registers associated with the line sensing arrays. Delay circuit 30 comprises one shift register to impose a delay equal to one line scan time. Delay circuit 28 comprises two shift registers 70 and 72 connected serially to impose a delay equal to two line scan times. The three shift registers 30, 70 and 72 share common transfer electrodes 74, two of which are shown for purposes of illustration. The multiphase clock signals applied to transfer electrodes 74 are generated by clock drivers 32'. Clock drivers 32' receive the same master clock signal that supplied clock drivers 32 to insure synchronization between the line sensing array shift registers and the delay shift registers.

As can be seen from FIG. 2, the signal generated by the blue sensitive line sensing array 22 is supplied to shift register 72 from whence it is applied to shift register 70 to provide the two line delay. The signal from red sensitive line sensing array 24 is supplied to shift register 30 to effect a one line delay. The signal produced by the green sensitive line sensing array 26 is undelayed. Thus the signals representing red and blue components of the scanner image will emerge from the line sensor 20 in proper synchronization with the green signal.

One desirable feature to be noted from the sensor arrangement shown in FIG. 2 is that there are no transfer electrodes over the blue sensitive photosites. Since blue light is most easily attenuated by overlying structure, this arrangement allows for increased blue sensor response.

The invention has been described in detail with particular reference to a preferred embodiment, but it will be understood that variations and modifications can be effected within the spirit and scope of the invention.

We claim:

1. A color line sensor for use in a color image scanning apparatus of the type having means including image forming optics for projecting a two-dimensional color image, a line sensor for scanning the projected image at a predetermined line scan rate, and means for continuously displacing the projected image relative to the line sensor in a direction perpendicular to the line scan to effect an image raster scan composed of a number of equally spaced lines, the color line sensor comprising:

first line sensing means responsive to a first wavelength range of light for producing a first color signal;

second line sensing means, spaced from said first line sensing means a distance corresponding to N times the spacing between scan lines of the raster scan and in the direction of relative image motion, where N is an integer, and responsive to a second wavelength range of light for producing a second color signal; and delay means responsive to said first color signal for producing a delayed first color signal, the delay being equal to N times the time required to scan one line, whereby said delayed first color signal and said second color signal represent scans of the same location in the image at a given instant in time.

2. A solid-state color line sensor for use with color film scanning apparatus of the type having means including image forming optics for projecting a two-dimensional image of a portion of the film, a line sensor for periodically scanning a line of the projected image of the film, and means for displacing the projected image relative to the line sensor in a direction generally perpendicular to the line scan to effect a raster scan of the projected image were successive lines of the raster are displaced by a distance d, the line sensor comprising:

a substrate;

first line sensing array means formed on said substrate and responsive to light to produce a first signal;

first filter means disposed over said line sensing array means for tailoring the spectral response thereof to within a first spectral region;

second line sensing array means formed on said substrate beside said first line sensing array means and displaced therefrom by a distance d in the direction of relative image motion, said second line sensing array means being responsive to light for producing a second signal;

second filter means disposed over said second line sensing array means for tailoring the spectral response thereof to within a second spectral region;

third line sensing array means formed on said substrate beside said second line sensing array means and displaced therefrom by a distance d in the direction of relative image motion, said third line sensing array means being responsive to light for producing a third signal;

third filter means disposed over said third line sensing array means for tailoring the spectral response thereof to within a third spectral region;

first time delay means responsive to said first signal for producing a time delayed first signal having a relative time delay equal to the time required to effect two line scans; and second time delay means responsive to said second signal for producing a time delayed second signal having a relative time delay equal to the time required to effect one line scan.

3. The invention claimed in claim 2 wherein: said first filter means is a green transmissive filter; said second filter means is a red transmissive filter and said third filter means is a blue transmissive filter.

4. The invention claimed in claim 3 wherein said first, second and third line sensing array means comprise charge coupled device line sensors and wherein said time delay means comprise charge coupled device shift registers.

5. The invention claimed in claim 4 wherein: each of said charge coupled devices line sensing array means comprises a row of photosensitive elements adjacent a charge coupled device shift register, the charge coupled device shift register having a plurality of transfer gates disposed thereover, and wherein the transfer gates for said first, second and third line sensing array means are common, extending over the rows of photosensitive elements of the first and second line sensing arrays, but not over the photosensitive elements of the third line sensing array.

* * * * *